United States Patent
Baco

[11] Patent Number: 5,968,180
[45] Date of Patent: Oct. 19, 1999

[54] DATA CAPTURE CIRCUIT FOR ASYNCHRONOUS DATA TRANSFER

[75] Inventor: Joseph C. Baco, Orangevale, Calif.

[73] Assignee: Intel Corporation, Santa Clara, Calif.

[21] Appl. No.: 08/940,626

[22] Filed: Sep. 30, 1997

[51] Int. Cl.⁶ .................................................. G06F 1/12
[52] U.S. Cl. ..................... 713/400; 713/401; 713/500; 713/600
[58] Field of Search ..................... 395/551, 555, 395/880, 200; 364/200; 713/400, 500, 600, 401; 709/400

[56] References Cited

U.S. PATENT DOCUMENTS

| | | | |
|---|---|---|---|
| 4,415,984 | 11/1983 | Gryger et al. | 713/500 |
| 4,723,227 | 2/1988 | Murotani | 365/200 |
| 4,811,364 | 3/1989 | Sager et al. | 375/106 |
| 4,881,165 | 11/1989 | Sager et al. | 364/200 |
| 4,984,190 | 1/1991 | Katori et al. | 364/900 |
| 5,313,594 | 5/1994 | Wakerly | 395/325 |
| 5,524,270 | 6/1996 | Haess et al. | 395/880 |
| 5,586,309 | 12/1996 | Lin | 713/501 |
| 5,600,824 | 2/1997 | Williams et al. | 713/400 |

*Primary Examiner*—Joseph E. Palys
*Assistant Examiner*—Abu Hossain
*Attorney, Agent, or Firm*—Blakely, Sokoloff, Taylor & Zafman

[57] ABSTRACT

A method and apparatus for capturing data. A first latch latches data from a data source in response to respective rising edge transitions of a first clock signal. A second latch latches data from the data source in response to respective falling edge transitions of the first clock signal. A delay circuit generates a second clock signal that lags the first clock signal by a delay period and, in response to respective transitions of the second clock signal, a multiplexer alternately selects the first latch and the second latch to output data to a storage element. A pulse strobe circuit strobes the output data into the storage element in response to the first clock signal and the second clock signal being in different states.

25 Claims, 5 Drawing Sheets

5,968,180

DATA CAPTURE CIRCUIT FOR ASYNCHRONOUS DATA TRANSFER

FIELD OF THE INVENTION

The present invention relates to the field of data transfer, and more particularly to a method and apparatus for capturing data at the rising and falling edges of a trigger signal.

BACKGROUND OF THE INVENTION

In traditional interfaces between computer system I/O devices and their supporting I/O controllers, the I/O controller asserts a strobe signal to the I/O device to signal the I/O device to either receive or output data. In addition to its handshaking function, the strobe signal is also used internally by the I/O controller to strobe data that is pending from the I/O device into a storage element within the controller. Conversely, when data is being transferred from the I/O controller to the I/O device, the strobe signal is used to cause logic within the controller to output a new data value to the I/O device.

One disadvantage of the above-described traditional interface between computer system I/O devices and their supporting I/O controllers is that the handshaking is one sided. That is, there is no signal from the I/O device to the I/O controller to indicate when new data is ready. Consequently, when data is being transferred from the I/O device to the I/O controller, the I/O controller must assume that a new data value has been asserted by the I/O device after each strobing edge of the strobe signal and that the new data value becomes valid at the I/O controller input within a specified time after the strobing edge. However, because I/O devices exhibit different strobe signal response times and because the impedance and length of the transmission path (often a cable) between the I/O device and the I/O controller is variable, data from the I/O device is not always valid at the I/O controller input in time to be captured. In those instances, invalid data is captured in the I/O controller.

Another disadvantage of traditional interfaces between computer system I/O devices and their supporting I/O controllers is that the interfaces are typically limited to preset data transfer rates for different I/O devices. For example, some I/O devices may be capable of outputting data at a significantly faster rate than the strobe signal rate. However, because in the traditional interface the I/O device does not signal the I/O controller when valid data is present, the I/O device is forced to await the strobe signal and output data at the slower strobe signal rate.

A related disadvantage of the traditional I/O controller-to-I/O device interface is that it does not support time-varying data transfer rates. For example, some devices have a "burst" data transfer ability, that is, the ability to occasionally output or receive data at a rate faster than the average transfer rate for the device. Using a traditional I/O controller-to-I/O device interface, such I/O devices are forced to await the strobe signal and output data at the strobe signal rate even though they are capable of occasional burst data rates that exceed the strobe signal rate.

SUMMARY OF THE INVENTION

A method and apparatus for capturing data are disclosed. Data from a data source is latched in a first latch in response to rising edge transitions of a first clock signal, and data from the data source is latched in a second latch in response to falling edge transitions of the first clock signal. A second clock signal that lags the first clock signal by a delay period is generated by a delay circuit and, in response to transitions of the second clock signal, a multiplexer alternately selects the first latch and the second latch to output data to a storage element. A pulse circuit strobes the output data into the storage element in response to the first clock signal and the second clock signal being in different states.

BRIEF DESCRIPTION OF THE DRAWINGS

The present invention is illustrated by way of example and not limitation in the figures of the accompanying drawings in which like references indicate similar elements and in which.

DETAILED DESCRIPTION

Figure 1:
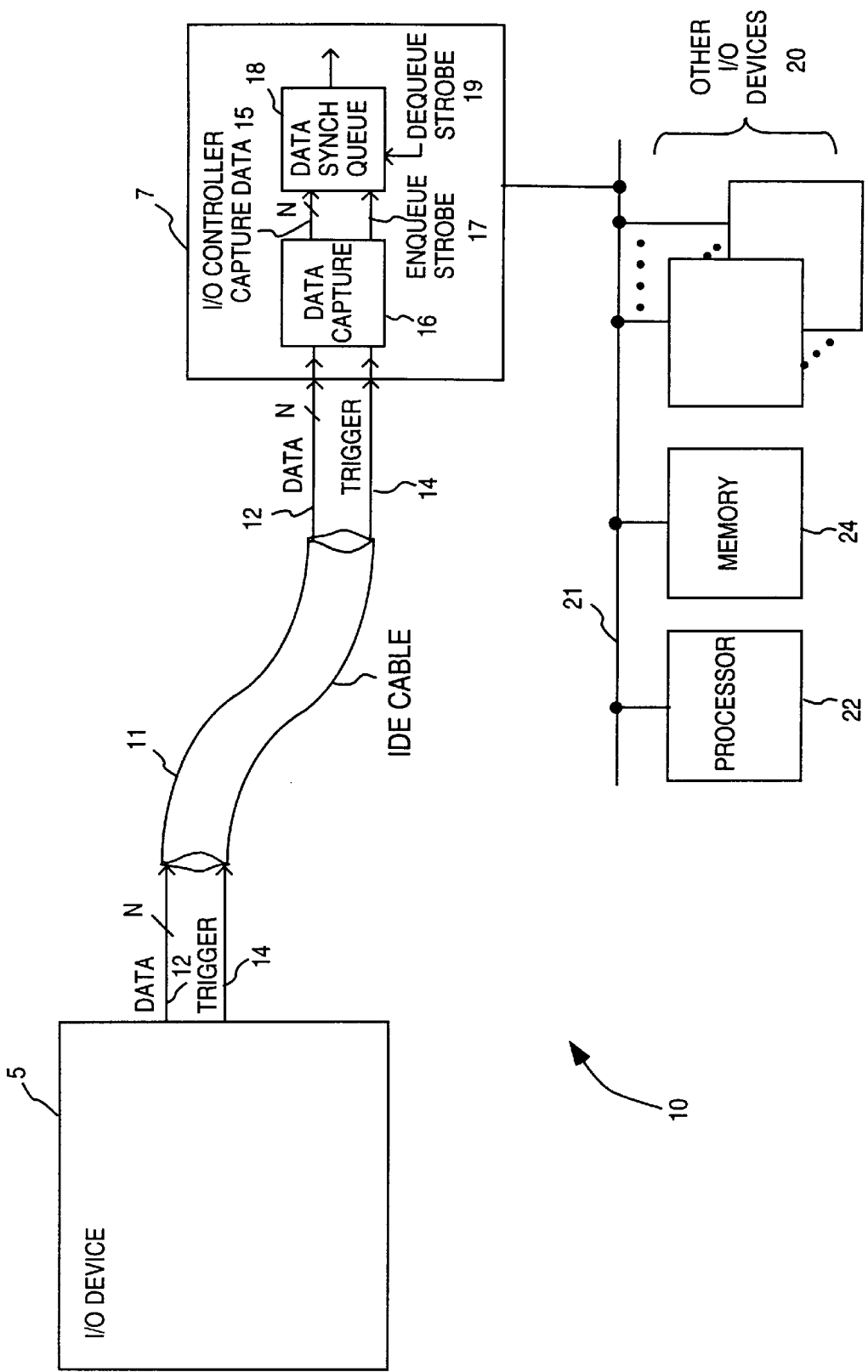
FIG. 1 is a block diagram of an apparatus that incorporates a data capture circuit according to one embodiment of the present invention.

FIG. 1 is a block diagram of an apparatus 10 that incorporates a data capture circuit according to one embodiment of the present invention. Apparatus 10 includes a processor 22, memory 24, I/O controller 7 one or more other I/O devices 20 all connected to bus 21. Apparatus 10 also includes an I/O device 5 coupled to I/O controller 7 via cable 11.

Apparatus 10 may be a computer system, camera, telephone, data recording instrument, or any other apparatus in which data must be transferred from an I/O device to a processor. Memory 24 typically includes a non-volatile memory component in which a boot program is stored and an operating memory (typically random-access memory (RAM)) used to store program code and data during operation of apparatus 10. In the case of a computer system, processor 22 may be a microprocessor, I/O device 5 may be a mass storage device such as a hard disk drive and other I/O devices 20 may include a keyboard, mouse or other cursor control device, and additional mass storage devices, core memory, and display. In the case of a telephone, processor 22 may be a microcontroller, I/O device 5 may be signal generation and reception circuitry and other I/O devices 20 may include a keypad, speaker and microphone. In other implementations, apparatus 10 may include additional components coupled to bus 21 to provide application-specific functionality.

According to one embodiment of the present invention, I/O controller 7 controls data transfer between processor 22 and I/O device 5 according to a data transfer interface defined in a specification entitled "Ultra DMA/33—A Proposal for a New Protocol in ATA/ATAPI" (specification X3T13 proposed to IEEE on Oct. 22, 1996—Document# D96153, Rev. 1B), referred to hereinafter as the "UDMA specification". An interface according to the UDMA specification differs from traditional I/O controller-to-I/O device interfaces in that the I/O device 5, not the I/O controller 7, supplies a trigger signal 14 to indicate that valid data is present on data lines 12. In this way, the I/O device 5 controls the rate of data transfer up to a maximum data transfer rate supported by the I/O controller 7. To increase the data transfer rate, for example, to support a burst data transfer, the frequency of the trigger signal 14 is increased by the I/O device 5.

Allocating control of the data transfer rate to the I/O device 5 is not without complications. For example, because the I/O controller 7 is typically clocked by a master clock signal provided on bus 21, data transferred to the I/O controller 7 by the I/O device 5 is asynchronous with respect to the clocking of the I/O controller 7. In other words, data is transferred from a first clock domain (determined by the frequency of trigger signal 14) into a second clock domain (the clock rate of the I/O controller 7) and must therefore be stored or buffered to allow transfer between the two clock domains. In one embodiment of the present invention, a data synchronization queue 18 within I/O controller 7 is provided to buffer data between the two clock domains. An enqueue strobe signal 17 is used to strobe data into a storage element (or bank of storage elements) within the data synchronization queue 18 and a dequeue strobe signal 19 is supplied to remove data from a storage element within the data synchronization queue 18.

Data capture circuit 16 is used to capture data presented on the N data lines 12 in response to transitions of trigger signal 14. According to one embodiment of the present invention, the data capture circuit 16 outputs a captured data signal (also on N data lines) and the enqueue strobe signal 17 to the data synchronization queue 18.

Because the UDMA specification requires that data from the I/O device 5 be captured at both rising and falling edges of the trigger signal 14, the setup and hold time margins for data supplied to storage elements within the data synchronization queue 18 are relatively short. Consequently, when data capture circuit 16 is implemented using traditional flip-flop-based designs, it becomes necessary to apply stringent layout constraints (e.g., equalizing conductor paths to reduce signal skew), and manual performance verification and inspection are needed to ensure that setup and hold time requirements to the data synchronization queue 18 are satisfied. This is undesirable and increases the cost of components used to implement the UDMA interface.

Figure 2:
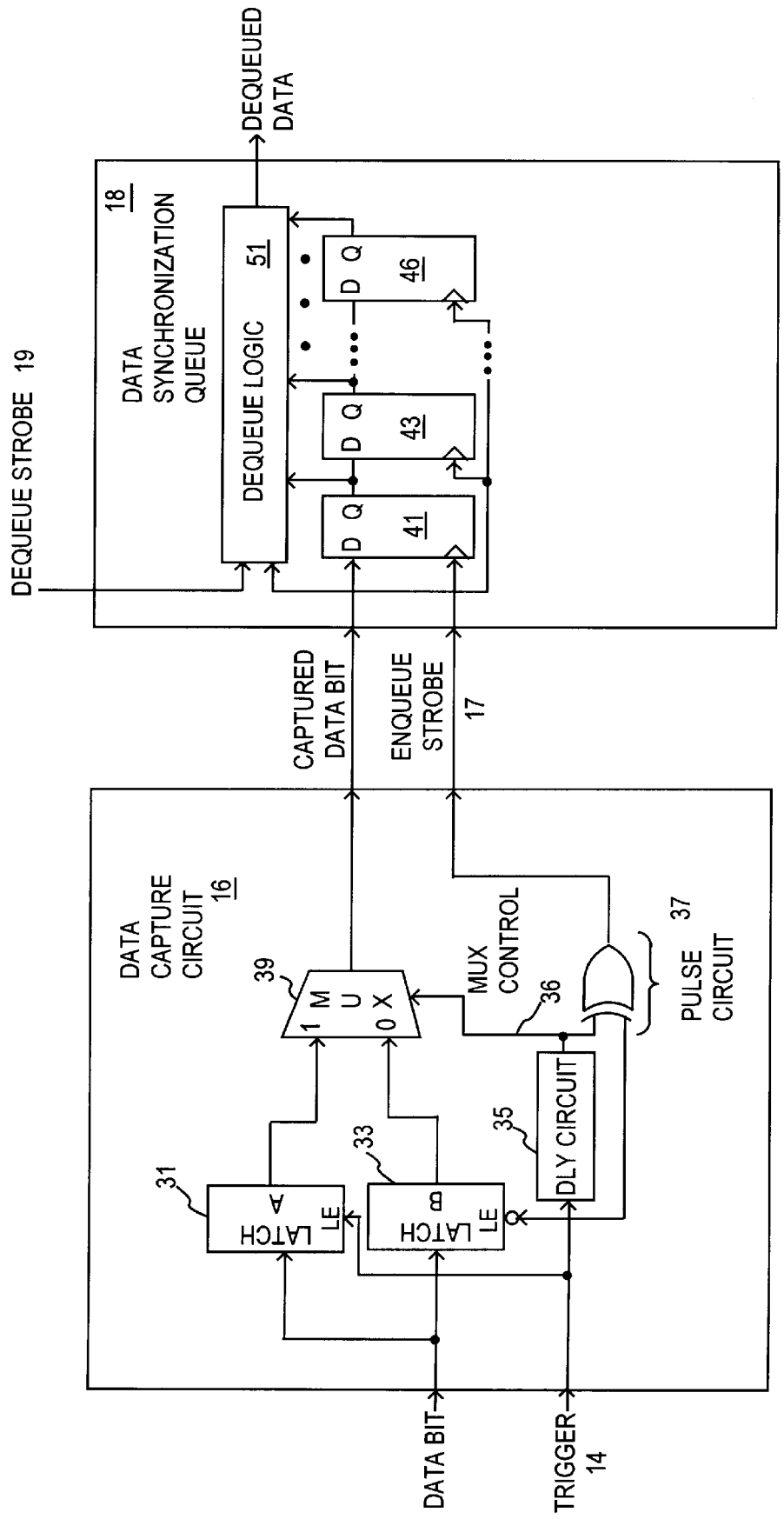
FIG. 2 is a diagram of a data capture circuit according to one embodiment of the present invention.

FIG. 2 is a diagram of the data capture circuit 16 of FIG. 1 according to one embodiment of the present invention. As shown in FIG. 2, a data bit (representing one bit of a multiple-bit data signal applied on the N data lines 12 of FIG. 1) is applied to the input of two transparent latches A and B (elements 31 and 33). The trigger signal 14 is received at respective latch enable (LE) inputs of latches A and B. Latch B differs from latch A only in that latch B responds to an inverted latch enable signal. This inverted latch enable function may be implemented by a transparent latch including an inverter element in the latch enable path or by a discrete inverter component.

According to one embodiment of the present invention, latches A and B are transparent latches, meaning that when a latch enable signal is asserted (e.g., a logic high level trigger signal 14 to latch A and a logic low level trigger signal 14 to latch B), data present at the latch input passes through the latch and appears on the latch output. That is, the latch becomes "transparent" when latch enable is asserted. When the latch enable signal is deasserted (e.g., a high-to-low transition of the trigger signal 14 to latch A and a low-to-high transition of the trigger signal 14 to latch B), data present at the latch output is latched to its present state so that signal transitions at the latch input have no further effect on the latch output. As discussed further below, the pass-through characteristic of transparent latches A and B is exploited in the present invention to increase the overall time that a signal output by data capture circuit 16 is asserted to the data synchronization queue 18. By increasing the data assertion time to the data synchronization queue 18, clock skew tolerances and layout constraints for the data capture circuit 16 and the data synchronization queue 18 can be relaxed and manual performance and verification steps can be avoided.

In addition to being coupled to the latch enable inputs of latch A and latch B, the trigger signal 14 is also coupled to the input of a delay circuit 35. The delay circuit 35 is used to generate a delayed trigger signal referred to herein as a multiplexer control signal 36. The multiplexer control signal 36 is supplied to a control input of multiplexer 39 to select the output of either latch A or latch B to drive the captured data bit (representing one bit of captured data signal 15 of FIG. 1) to the data synchronization queue 18. For the purpose of the present invention, a multiplexer may be any circuit capable of selectively outputting one of a plurality of input signals in response to a control signal.

Data capture circuit 16 also includes a pulse circuit 37 to generate the enqueue strobe signal 17 to the data synchronization queue 18. According to one embodiment of the present invention, pulse circuit 37 is implemented by an exclusive-OR gate that receives the trigger signal 14 and the multiplexer control signal 36 at its inputs. Consequently, the pulse circuit 37 outputs a logic high level signal when the trigger signal 14 and the multiplexer control signal 36 are in different states, and a logic low level signal when the trigger signal 14 and the multiplexer control signal are in the same state. Because the multiplexer control signal 36 lags trigger signal 14 by the delay period introduced by delay circuit 35, pulse circuit 37 outputs a pulse having a width equal to the delay period whenever the trigger signal 14 transitions between binary states.

According to one embodiment of the present invention, the enqueue strobe signal 17 is used to clock a group of storage elements that form the data synchronization queue 18. In FIG. 2, for example, the queue of storage elements are depicted as cascaded flip-flops 41, 43 and 46. A captured data bit is clocked into flip-flop 41 in response to a first rising edge transition of enqueue strobe signal 17, and is then rippled down to flip-flop 43 and ultimately to flip-flop 46 in response to a successive rising edge transitions of enqueue strobe signal 17. The data path and enqueue strobe signal path between flip-flops 43 and 46 is dotted to indicate that an M-deep FIFO structure may be implemented by the data synchronization queue 18, with M being determined by the number of flip-flops in the chain.

Because data may be dequeued asynchronously with its insertion into the data synchronization queue 18, dequeue logic 51 is provided to receive the output of each of the queue storage elements 41, 43, 46. The dequeue logic 51 also receives the enqueue strobe signal 17 so that it can track the movement of data in the queue. In effect, the enqueue strobe signal acts to move a queue head indicator one storage element deeper in the data synchronization queue 18. Whenever the controller (e.g., element 7 of FIG. 1) is ready for the next enqueued data value, it asserts the dequeue strobe signal 19. The dequeue strobe signal 19 causes the dequeue logic 51 to output the data value at the head of the queue (i.e., the oldest data value in the data synchronization queue 18) and also effectively causes the dequeue logic 51 to move a pointer to the head of the data synchronization queue 18 one storage element shallower in the queue.

It will be appreciated that while data capture circuit 16 and data synchronization queue 18 are illustrated in FIG. 2 as having a single bit data path, a multiple-bit data path (e.g., N bits) may be achieved by providing parallel data capture circuits 16 and data synchronization queue circuits 18. It will be further appreciated that certain elements of the data capture circuit 16 (e.g., the delay circuit and pulse circuit) need not be replicated to support multiple-bit data capture.

Figure 3:
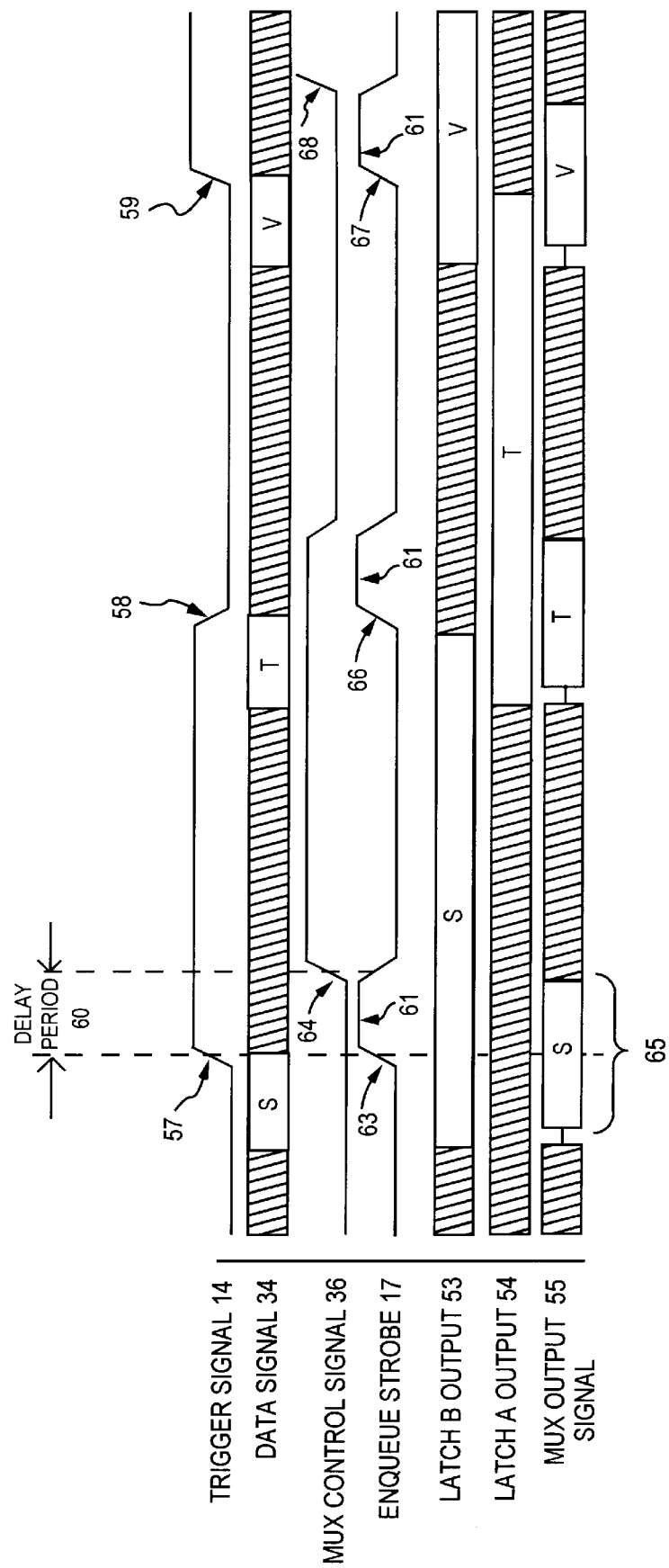
FIG. 3 is a timing diagram of the operation of a data capture circuit according to one embodiment of the present invention.

FIG. 3 is a timing diagram of the operation of the data capture circuit 16 of FIG. 2. As shown in FIG. 3, data bits S, T and V become valid on the data signal 34 for a short period of time prior to respective transitioning edges (57, 58, 59) of the trigger signal 14. A primary function of the data capture circuit 16 of FIG. 2 is to capture data bits S, T and V and assert each at the input of the data synchronization queue 18 for a period of time sufficient to meet the setup and hold time of the storage elements therein.

As discussed above, the multiplexer control signal 36 is generated by delaying the trigger signal for a delay period 60. The enqueue strobe signal 17 is generated by exclusively-ORing the multiplexer control signal 36 and the trigger signal 14. As discussed above, this results in a pulse 61 starting at each transition of the trigger signal and having a pulse width equal to the delay period 60.

Because latch B (e.g., element 33 of FIG. 2) is enabled by a logic low trigger signal 14, latch B begins to output data bit S as soon as it becomes valid on the data bit input. This is shown in FIG. 3 by the latch B output signal 53.

At the next rising edge of the trigger signal 57, data bit S is latched at the output of latch B and remains valid at the output of latch B until the trigger signal 14 again drops to an active low level at 58.

Because the multiplexer (e.g., element 39 of FIG. 2) selects the latch B output to drive the data synchronization queue when the multiplexer control signal 36 is in a logic low state, data bit S is supplied to the data synchronization queue from the time the data bit first becomes valid to the time that the multiplexer control signal is transitioned to select the latch A output. This is shown in FIG. 3 by the multiplexer output signal 55. Consequently, a valid data bit is supplied to the input of the data synchronization queue from a time prior to the rising edge 57 of the trigger signal 14 to the rising edge 57 of the trigger signal 14 plus the delay period 60. In other words, the total valid time of the data bit S is extended beyond the time that data bit S is valid on the data bit input by the delay period 60. Further, because the rising edge 63 of the enqueue strobe signal 17 occurs at a time after the data bit S first becomes valid and before subsequent rising edge 64 of the multiplexer control signal 36, the rising edge 63 of the enqueue strobe signal 17 falls within the time that the multiplexer asserts a valid data bit S to the data synchronization queue (indicated by interval 65 in multiplexer output signal 55). Because the total valid time of data bit S is extended beyond the valid time of the data bit S on data signal 34, and because the strobing edge 63 of the enqueue strobe signal 17 falls within the interval 65 over which the multiplexer outputs a valid data bit S, the data capture circuit of the present invention permits relaxed timing and layout constraints and avoids the need for manual performance verification and inspection.

Still referring to FIG. 3, data bit T becomes valid on the data signal 34 for a time period just prior to the falling edge 58 of the trigger signal 14. Because the trigger signal 14 is in a logic high state when data bit T becomes valid, data bit T flows through transparent latch A (e.g., element 31 of FIG. 2) and is selected by the multiplexer to drive the data capture input to the data synchronization queue. Again, by exploiting the flow through path to the data synchronization queue, the present invention permits data setup time at the data synchronization queue prior to the falling edge 58 of the trigger signal 14. Then, when the trigger signal transitions from a logic high state to a logic low state at 58, data bit T is latched at the output of latch A to provide hold time to the data synchronization queue after the strobing edge 66 of the enqueue strobe signal 17. As shown by latch A output signal 54, a valid data bit T is output by latch A starting at the time that data bit T first becomes valid and continuing until the next rising edge transition 59 of the trigger signal 14. As indicated by multiplexer output signal 55, the multiplexer continues to output valid data bit T for a time after the strobing edge 66 of the enqueue strobe signal 17 equal to the delay period 60 between the trigger signal 14 and the multiplexer control signal 36.

Shortly before the last rising edge 59 of the trigger signal 14 shown in FIG. 3, data bit V becomes valid on data signal 34. As indicated by latch B output signal 53, data bit V is passed through transparent latch B prior to the rising edge of the trigger signal and is latched at the output of latch B at the rising edge 59 of the trigger signal 14. Latch B continues to output data bit V until the next falling edge of the trigger signal (not shown in FIG. 3). As indicated by multiplexer output signal 55, data bit V is selected to drive the data capture bit to the data synchronization queue until the multiplexer control signal transitions at 68 to select the latch A output. As described above, the effect of passing data bit V through transparent latch B and the multiplexer prior to the rising edge 59 of the trigger signal 14, when combined with the latched output of data bit V after the rising edge 59 of the trigger signal 14, is to assert data bit V at the data synchronization queue for a time longer than the time data bit V is valid on data signal 34. The strobing edge 67 of the enqueue strobe signal 17 is centered within the time that data bit V is asserted to the data synchronization queue so that ample setup and hold time is provided.

Figure 4:
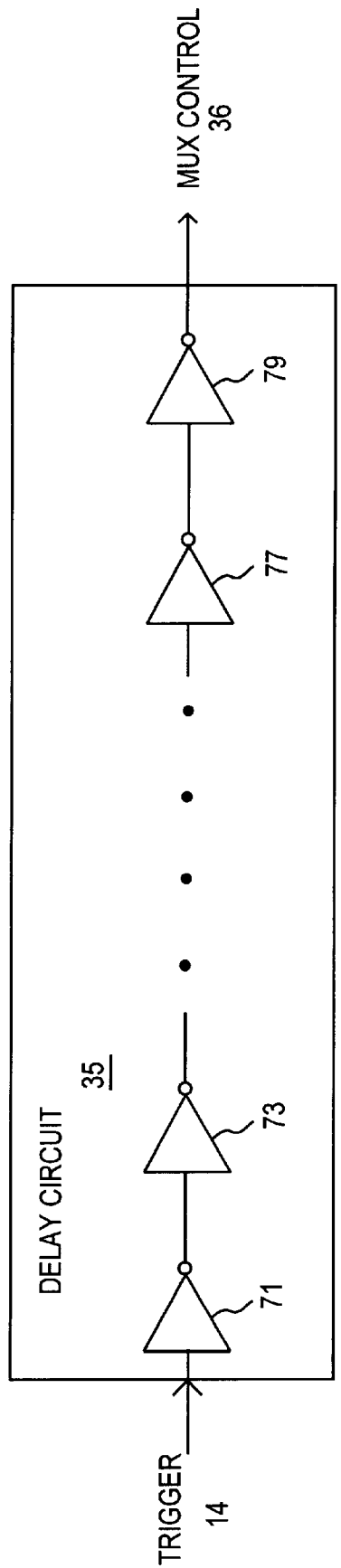
FIG. 4 is a diagram of a delay circuit according to one embodiment of the present invention.

FIG. 4 is a diagram of the delay circuit 35 of FIG. 2 according to one embodiment of the present invention. A sequence of inverter pairs (e.g.., 71,73 and 77,79) are coupled between the trigger signal 14 and the multiplexer control signal 36. The propagation delay introduced by each inverter pair constitutes a portion of the total time by which multiplexer control signal 36 lags the trigger signal 14. As indicated by the dots between inverter 73 and inverter 77, the total number of inverter pairs may be varied to achieve an optimal delay period. A delay circuit 35 implemented using other techniques, including techniques that allow the delay period to be adjusted after circuit fabrication (e.g., by component trimming) and even techniques that allow the delay period to be adjusted dynamically (e.g., by bypassing one or more delay elements in response to control inputs) during circuit operation, would not depart from the spirit and scope of the present invention.

Figure 5:
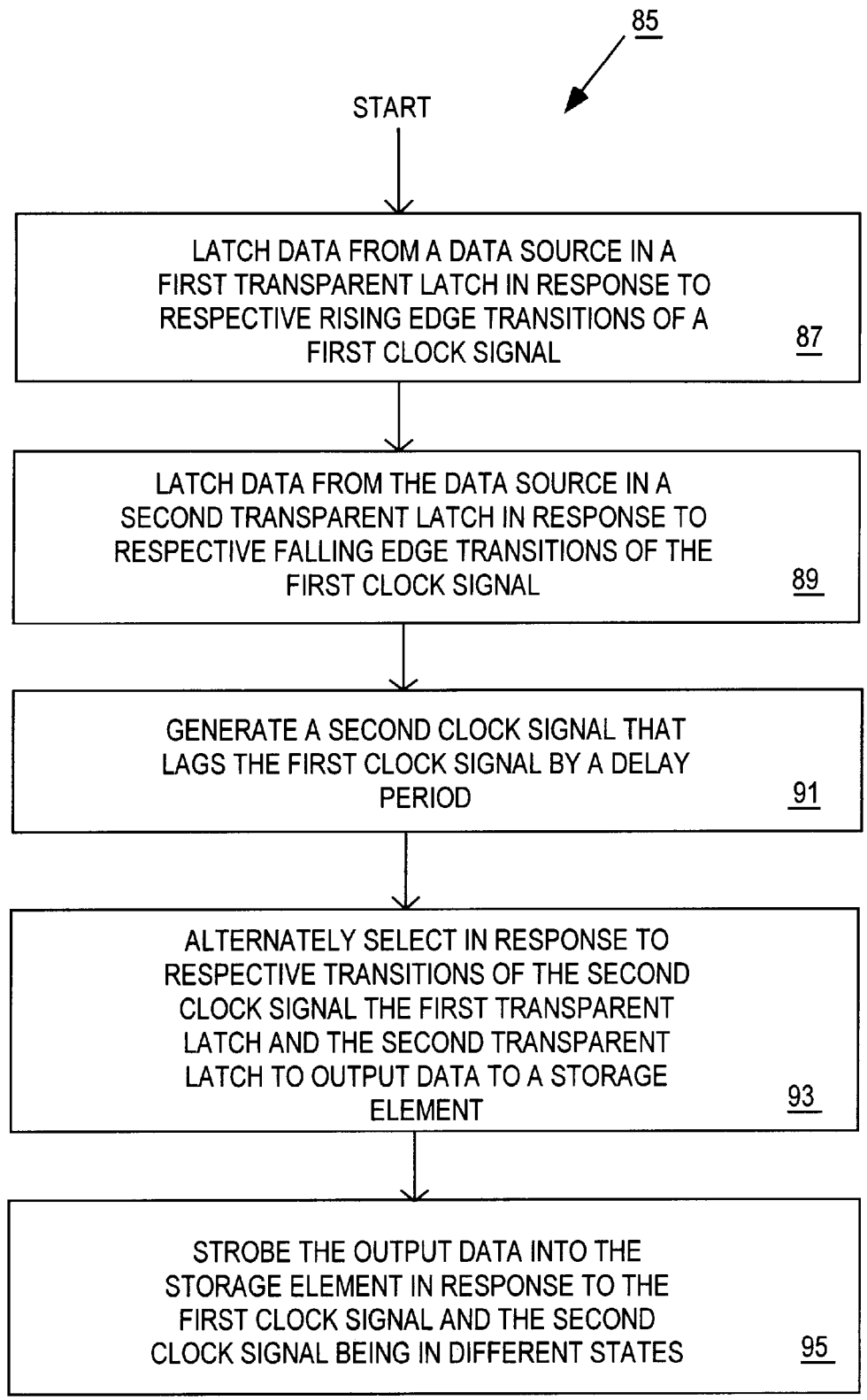
FIG. 5 is a method diagram according to one embodiment of the present invention.

FIG. 5 is a method diagram 85 according to one embodiment of the present invention. Starting at step 87, data from a data source is latched in a first transparent latch in response to respective rising edge transitions of a first clock signal. At step 89, data from the data source is latched in a second transparent latch in response to respective falling edge transitions of the first clock signal. Taken together, steps 87 and 89 describe a pair of transparent latches that alternately latch data in response to a clock or trigger signal. A second clock signal that lags the first clock signal by a delay period is generated at step 91. The second clock signal corresponds, for example, to the multiplexer control signal described above (e.g., element 36 of FIG. 2). At step 93, the first transparent latch and the second transparent latch are alternately selected to output data to a storage element in response to respective transitions of the second clock signal. This can be accomplished using a multiplexer as described above (e.g., element 39 of FIG. 2) or by any other signal selection technique. At step 95, the data output to the storage element in step 93 is strobed into the storage element in response to the first clock signal and the second clock signal being in different states. As discussed above in reference to FIG. 2, step 95 may be performed using a pulse circuit based, for example, on an exclusive-OR combination of the first and second clock signals. Other techniques for generating the strobe signal based on a difference between the first and second clock signal are within the spirit and scope of the present invention.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly to be regarded in an illustrative rather than a restrictive sense.

What is claimed is:

1. An apparatus comprising:
   a first transparent latch to latch data from a data source in response to respective rising edge transitions of a first clock signal;
   a second transparent latch coupled in parallel with the first transparent latch to latch data from the data source in response to respective falling edge transitions of the first clock signal;
   a delay circuit to generate a second clock signal that lags the first clock signal by a delay period;
   a multiplexer to alternately select in response to respective transitions of the second clock signal the first transparent latch and the second transparent latch to output data to a storage element; and
   a pulse circuit to strobe the output data into the storage element in response to the first clock signal and the second clock signal being in different states.

2. The apparatus of claim 1 wherein a data value from the data source is output from the first latch starting at a time prior to a rising edge transition of the first clock signal and continuing at least until the rising edge transition plus the delay period.

3. The apparatus of claim 2 wherein the first latch is selected to output the data value to the storage element starting at least by the time prior to the rising edge transition of the first clock signal and continuing at least until the rising edge transition plus the delay period.

4. The apparatus of claim 1 wherein the delay circuit includes
   an input coupled to receive the first clock signal,
   an output to output the second clock signal, and
   one or more delay elements coupled between the input and output to delay the first clock signal by the delay period to generate the second clock signal.

5. The apparatus of claim 1 wherein the pulse circuit is an exclusive-OR logic gate having an output coupled to a clock input of the storage element and inputs respectively coupled to receive the first clock signal and the second clock signal.

6. The apparatus of claim 1 wherein the storage element is a queue including a plurality of flip-flops.

7. The apparatus of claim 6 wherein data is removed from the queue asynchronously to the first clock signal and the second clock signal.

8. The apparatus of claim 1 wherein the first clock signal is output by the data source.

9. An apparatus comprising:
   means for latching data in a first transparent latch in response to respective rising edge transitions of a first clock signal;
   means for latching data in a second transparent latch coupled in parallel with the first transparent latch in response to respective falling edge transitions of the first clock signal;
   means for generating a second clock signal that lags the first clock signal by a delay period;
   means for alternately selecting in response to respective transitions of the second clock signal the first latch and the second latch to output data to a storage element; and
   means for strobing the output data into the storage element in response to the first clock signal and the second clock signal being in different states.

10. The apparatus of claim 9 further comprising means for outputting data from the data source at an output of the first latch starting at a time prior to a rising edge transition of the first clock signal and continuing at least until the rising edge transition plus the delay period.

11. The apparatus of claim 9 wherein said means for alternately selecting includes means for selecting the first latch to output data to the storage element starting at least by the time prior to the rising edge transition of the first clock signal and continuing at least until the rising edge transition plus the delay period.

12. The apparatus of claim 9 wherein said means for generating a second clock signal includes means for delaying the first clock signal by the delay period.

13. The apparatus of claim 9 wherein said means for strobing the output data into the storage element in response to the first clock signal and the second clock signal being in different states comprises:
   means for receiving the first clock signal and the second clock signal at respective inputs of a logic circuit having an output coupled to a strobe input of the storage element;
   means for asserting at the output of the logic circuit a signal having a first state if the first clock signal and the second clock are in different states; and
   means for asserting at the output of the logic circuit a signal having a second state if the first clock signal and the second clock are in the same state.

14. A computer system comprising:
   a processor;
   an I/O device;
   an I/O controller coupled to the processor and to the I/O device for communicating data there between, the I/O controller having a storage element and an interface circuit for strobing data output by the I/O device into the storage element, the interface circuit including
   a first transparent latch to latch data from the I/O device in response to respective rising edge transitions of a trigger signal output by the I/O device;
   a second transparent latch coupled in parallel with the first transparent latch to latch data from the I/O device in response to respective falling edge transitions of the trigger signal;
   a delay circuit to generate a multiplexer control signal that lags the trigger signal by a delay period;
   a multiplexer to alternately select in response to respective transitions of the multiplexer control signal the first latch and the second latch to output data to the storage element; and a pulse circuit to strobe the output data into the storage element in response to the trigger signal and the multiplexer control signal being in different states.

15. The computer system of claim 14 wherein a data value from the I/O device is output from the first latch starting at a time prior to a rising edge transition of the trigger signal and continuing at least until the rising edge transition plus the delay period.

16. The computer system of claim 15 wherein the first latch is selected to output the data value to the storage element starting at least by the time prior to the rising edge transition of the trigger signal and continuing at least until the rising edge transition plus the delay period.

17. The computer system of claim 14 wherein the delay circuit includes an input coupled to receive the trigger signal;

an output to output the multiplexer control signal;

and one or more delay elements coupled between the input and output to delay the trigger signal by the delay period to generate the multiplexer control signal.

18. The computer system of claim 14 wherein the pulse circuit is an exclusive-OR logic gate having an output coupled to a clock input of the storage element and inputs respectively coupled to receive the trigger signal and the multiplexer control signal.

19. The computer system of claim 14 wherein the storage element is a queue including a plurality of flip-flops.

20. A method comprising the steps of:

latching data from a data source in a first transparent latch in response to respective rising edge transitions of a first clock signal;

latching data from the data source in a second transparent latch coupled in parallel with the first transparent latch in response to respective falling edge transitions of the first clock signal;

generating a second clock signal that lags the first clock signal by a delay period;

alternately selecting in response to respective transitions of the second clock signal the first latch and the second latch to output data to a storage element; and strobing the output data into the storage element in response to the first clock signal and the second clock signal being in different states.

21. The method of claim 20 further comprising the step of outputting data from the data source at an output of the first latch starting at a time prior to a rising edge transition of the first clock signal and continuing at least until the rising edge transition plus the delay period.

22. The method of claim 21 wherein said step of alternately selecting includes the step of selecting the first latch to output data to the storage element starting at least by the time prior to the rising edge transition of the first clock signal and continuing at least until the rising edge transition plus the delay period.

23. The method of claim 20 wherein said step of generating a second clock signal includes the step of delaying the first clock signal by the delay period.

24. The method of claim 20 wherein said step of alternately selecting includes the steps of:

receiving data output by the first latch at a first input of a multiplexer;

receiving data output by the second latch at a second input of the multiplexer;

coupling the first input of the multiplexer to an input of the storage element when the second clock signal is in a first state; and coupling the second input of the multiplexer to the input of the storage element when the second clock is in a second state.

25. The method of claim 20 wherein said step of strobing the output data into the storage element in response to the first clock signal and the second clock signal being in different states includes the steps of:

receiving the first clock signal and the second clock signal at respective inputs of a logic circuit having an output coupled to a strobe input of the storage element;

asserting at the output of the logic circuit a signal having a first state if the first clock signal and the second clock are in different states; and asserting at the output of the logic circuit a signal having a second state if the first clock signal and the second clock are in the same state.

* * * * *